United States Patent
Ho et al.

(10) Patent No.: US 7,170,207 B2
(45) Date of Patent: Jan. 30, 2007

(54) MOTPOR DEVICE CAPABLE OF REDUCING COGGING TORQUE

(75) Inventors: Chun-Liang Ho, Taipei (TW); Ching-Min Yang, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 0 days.

(21) Appl. No.: 11/056,096

(22) Filed: Feb. 14, 2005

(65) Prior Publication Data

US 2006/0181164 A1    Aug. 17, 2006

(51) Int. Cl.
H02K 5/24 (2006.01)
H02K 7/00 (2006.01)
H02K 11/00 (2006.01)

(52) U.S. Cl. .................. 310/67 R; 310/254; 310/51
(58) Field of Classification Search ............. 310/254, 310/67 R, 51; 417/423.7
See application file for complete search history.

(56) References Cited

U.S. PATENT DOCUMENTS

| 3,454,801 | A | * | 7/1969 | Suzuki et al. | .......... 310/156.03 |
| 6,512,319 | B1 | * | 1/2003 | Horng et al. | .............. 310/254 |
| 2003/0020355 | A1 | * | 1/2003 | Horng et al. | .............. 310/216 |

* cited by examiner

Primary Examiner—Tran Nguyen (57) ABSTRACT

A motor device capable of reducing cogging torque includes a stator assembly and a rotor assembly, which is movably disposed in the stator assembly. The rotor assembly provides a magnetic component. The stator assembly further includes an insulation frame part, a set of silicone steel sheets and a coil winding the insulation frame. A plurality of circular strip members are disposed at the circumferential side of the bottom of the stator assembly in a way of the respective circular strip member has an end thereof being attached to the bottom of the insulation frame part and another end thereof extending circumferentially to the sector shaped space. Further, the circular strip members space apart from each other without contacting the silicone steel sheets.

1 Claim, 10 Drawing Sheets

MOTPOR DEVICE CAPABLE OF REDUCING COGGING TORQUE

BACKGROUND OF THE INVENTION

1. Field of the Invention

The present invention is related to a motor device capable of reducing cogging torque and particularly to a structure of the stator in a motor able to reduce cogging torque.

2. Brief Description of the Related Art

Figure 1:
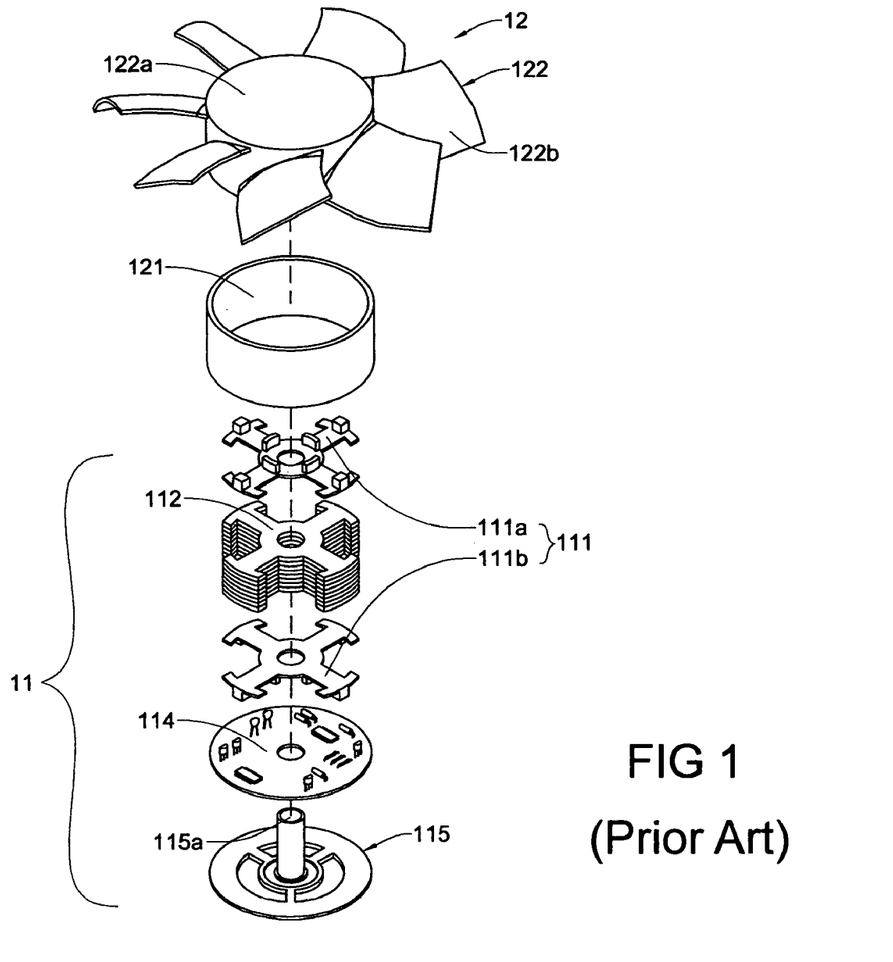
FIG. 1 is an exploded perspective view of a conventional motor.
Figure 2:
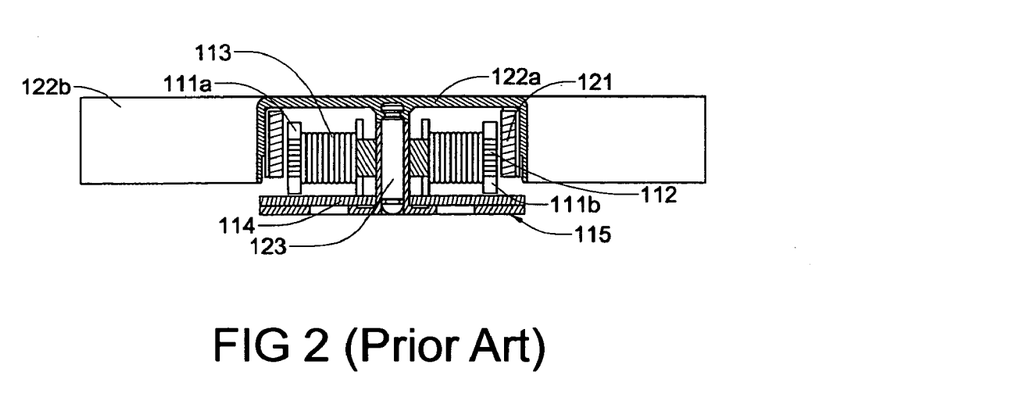
FIG. 2 is an assembled perspective view of FIG. 1.
Figure 3:
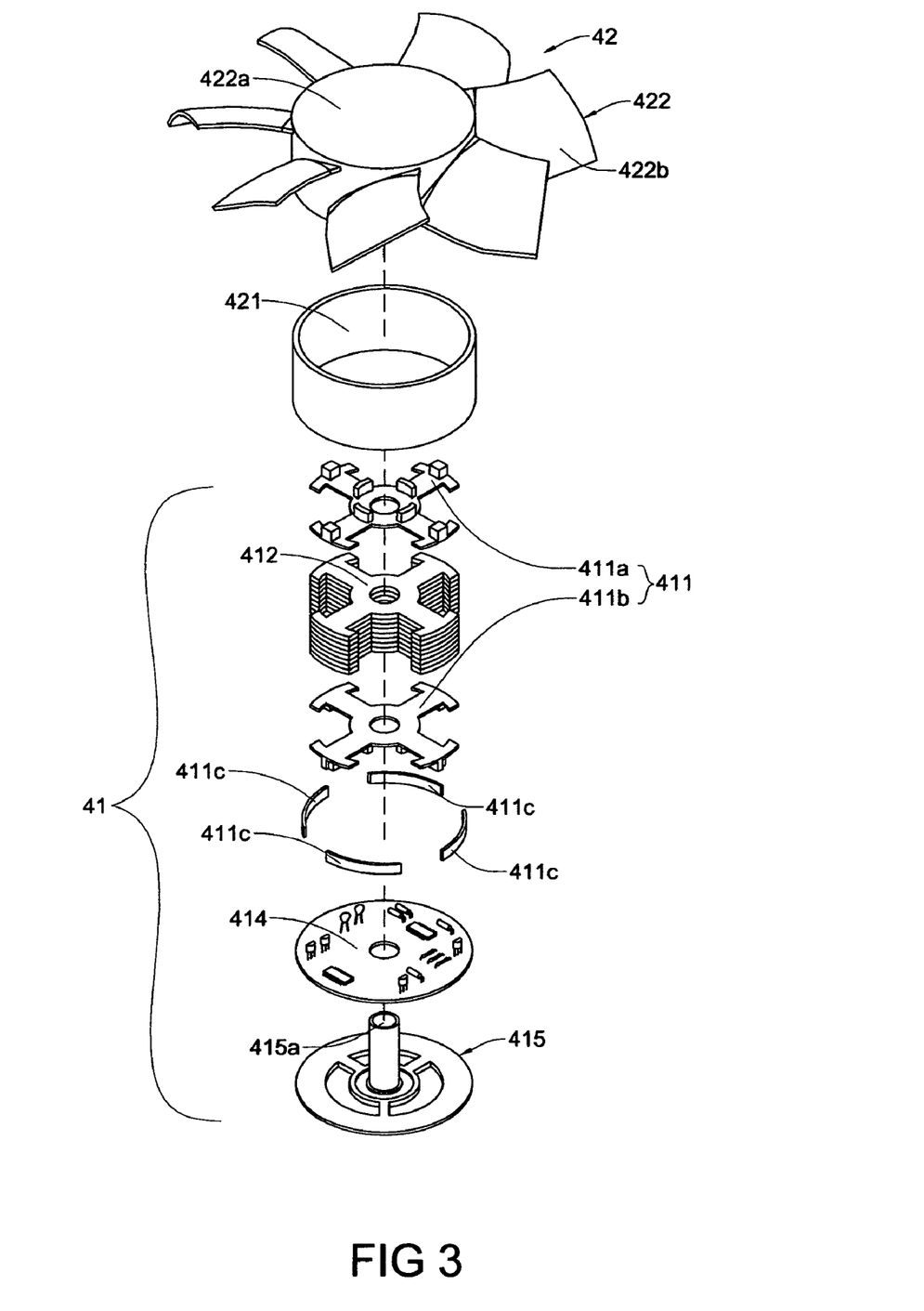
FIG. 3 is an exploded perspective view of the first embodiment of a motor device capable of reducing cogging torque according to the present invention.
Figure 4:
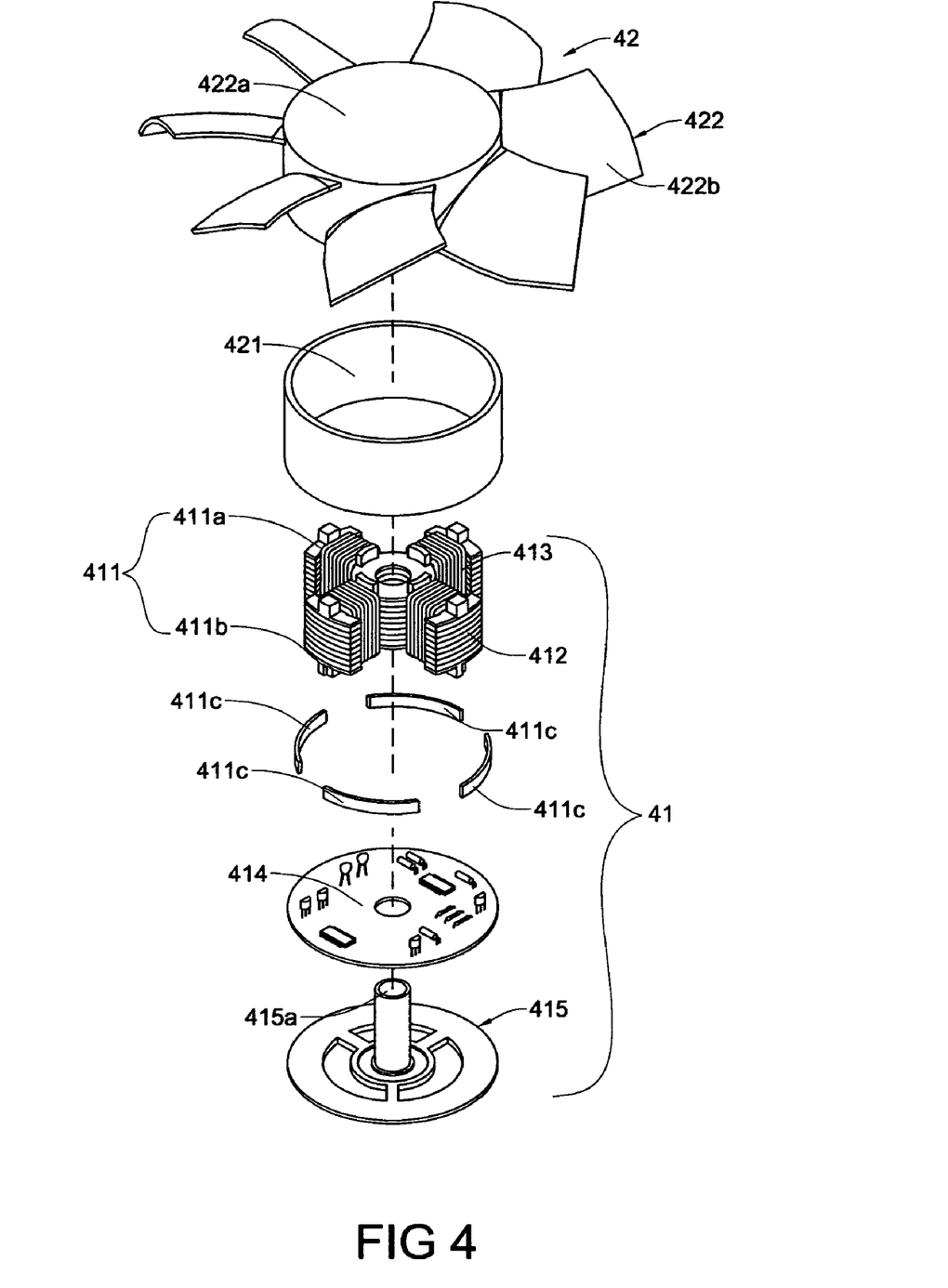
FIG. 4 is an exploded perspective view illustrating the insulation frame of the first embodiment being wound with a coil.
Figure 5:
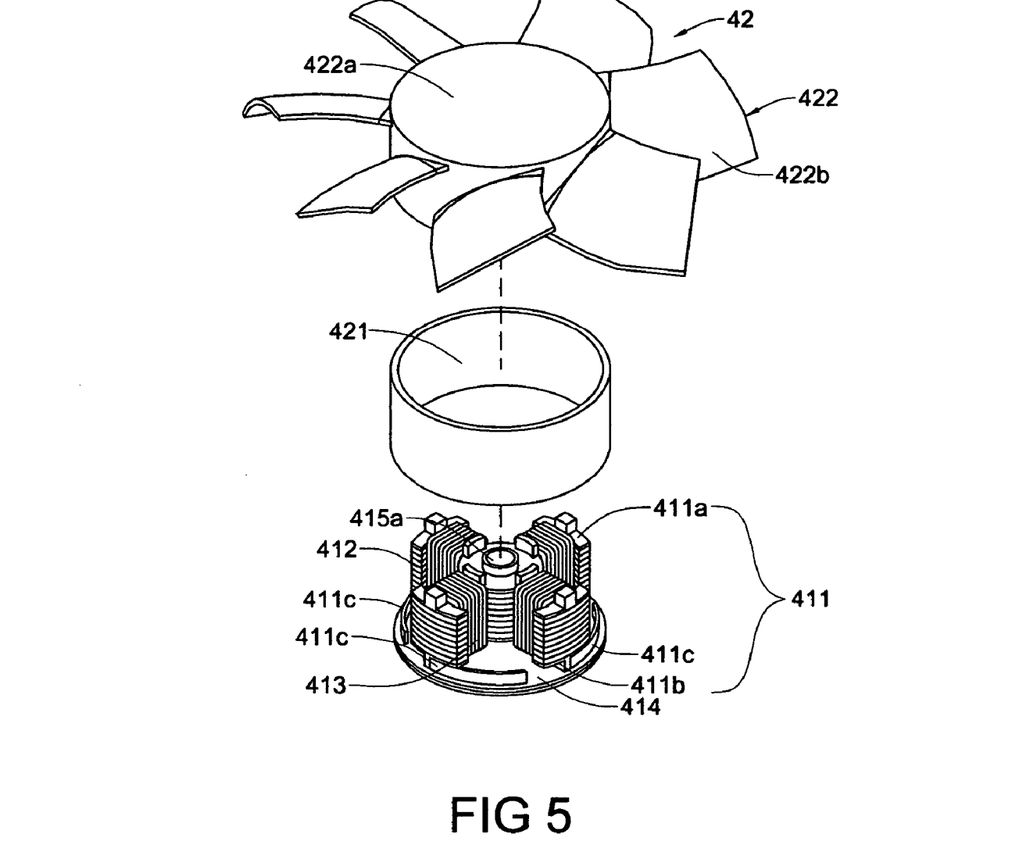
FIG. 5 is a partly perspective view illustrating the insulation frame of the first embodiment being wound with a coil.
Figure 6:
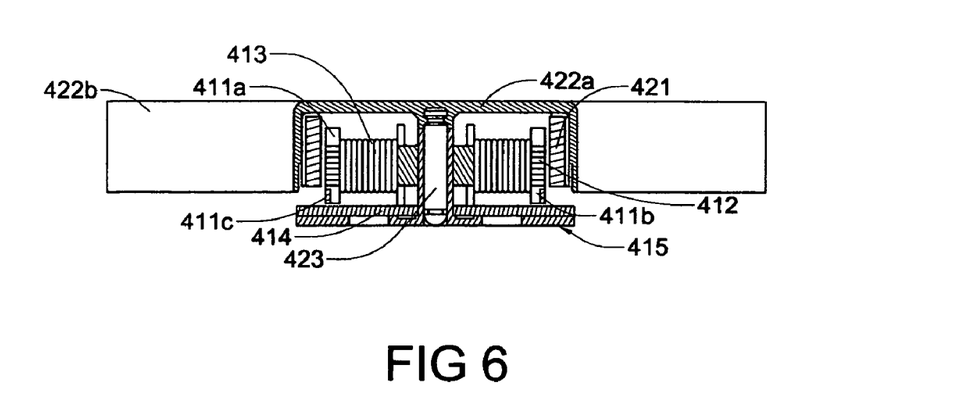
FIG. 6 is a sectional view of the first embodiment of a motor device capable of reducing cogging torque according to the present invention.
Figure 7:
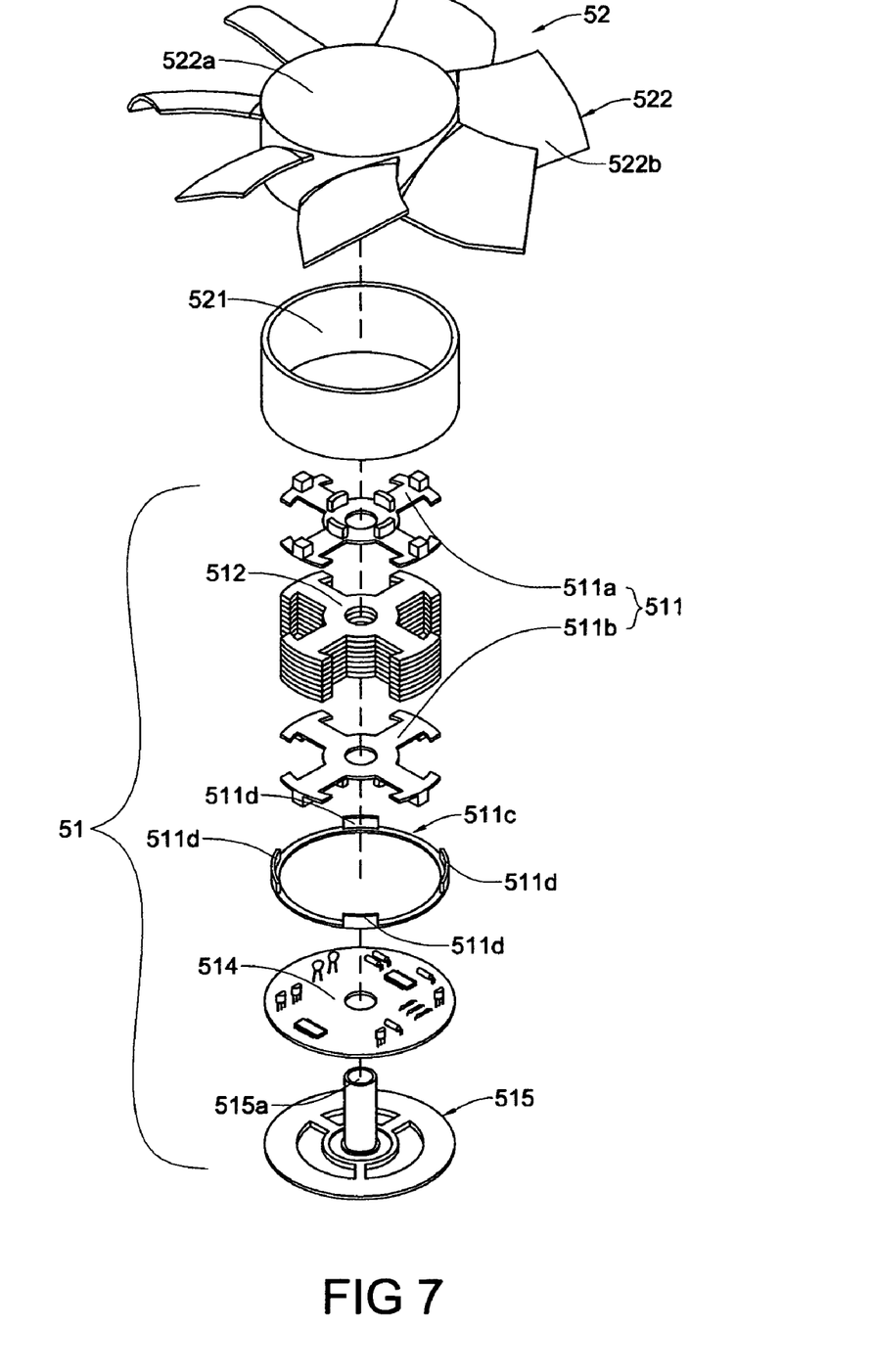
FIG. 7 is an exploded perspective view of the second embodiment of a motor device capable of reducing cogging torque according to the present invention.
Figure 8:
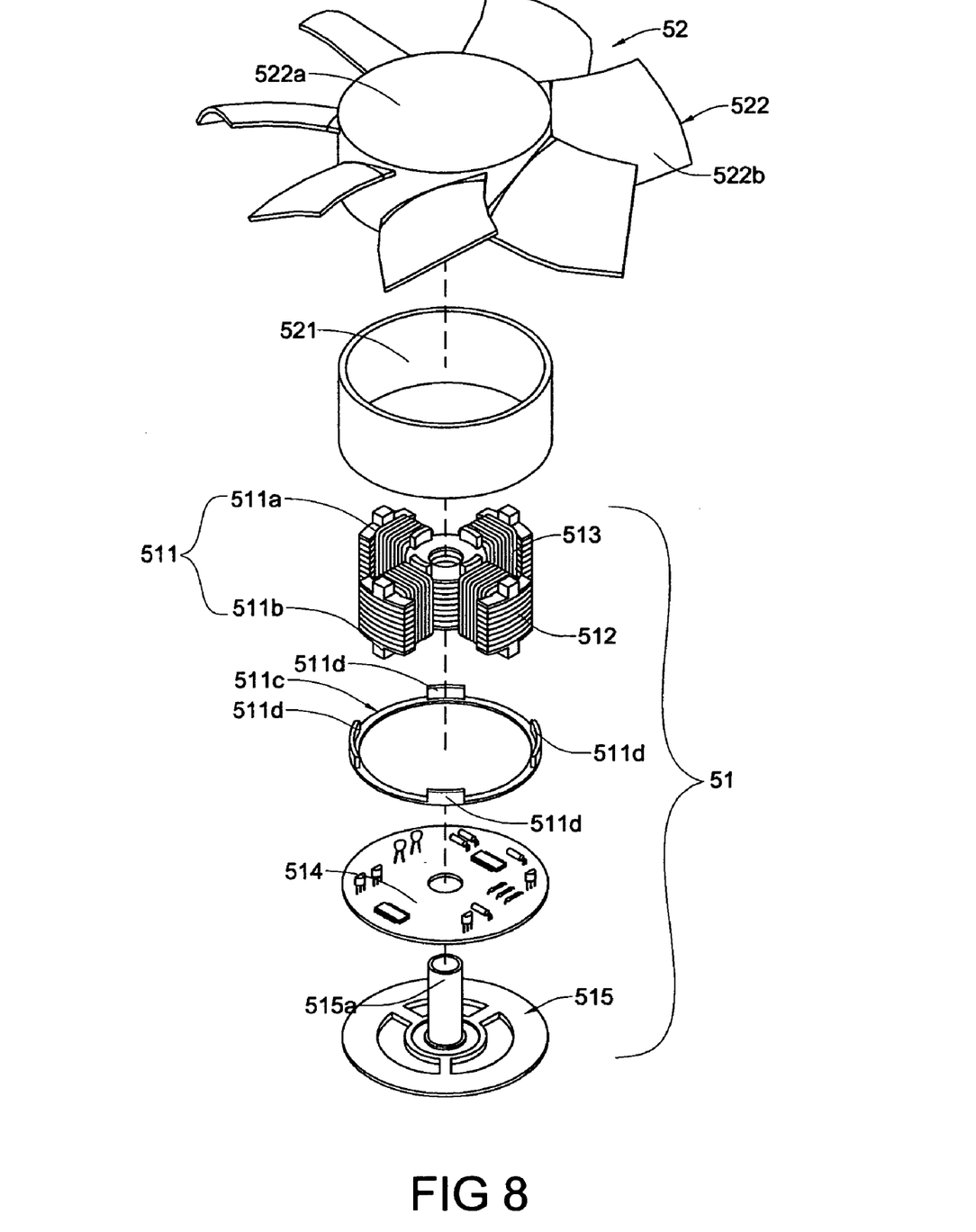
FIG. 8 is an exploded perspective view illustrating the insulation frame of the second embodiment being wound with a coil.
Figure 9:
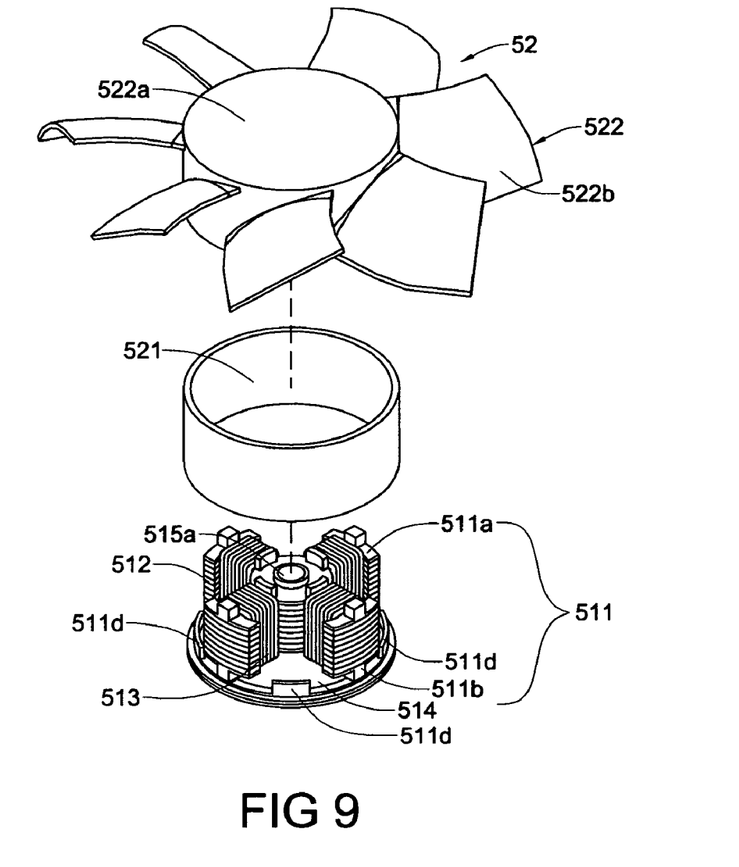
FIG. 9 is a partly perspective view illustrating the insulation frame of the second embodiment being wound with a coil.
Figure 10:
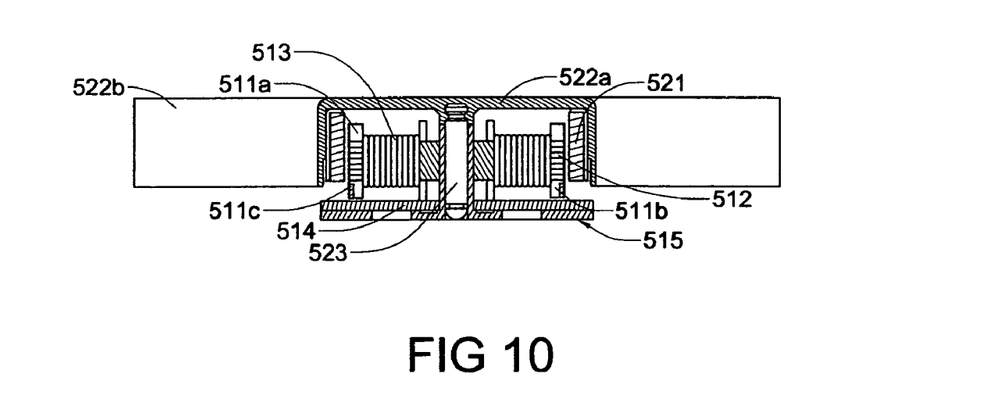
FIG. 10 is a sectional view of the second embodiment of a motor device capable of reducing cogging torque according to the present invention.
Figure 11:
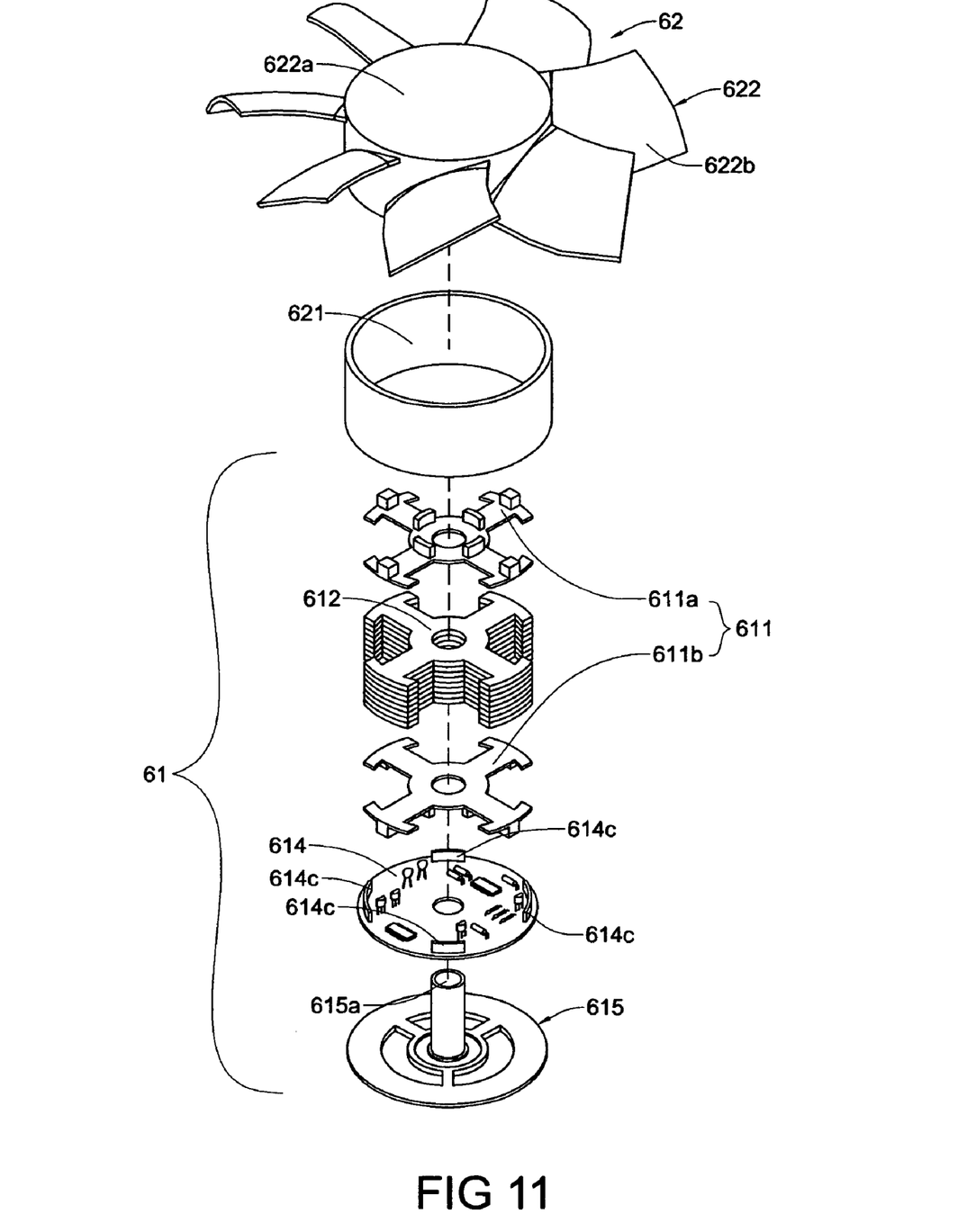
FIG. 11 is an exploded perspective view of the third embodiment of a motor device capable of reducing cogging torque according to the present invention.
Figure 12:
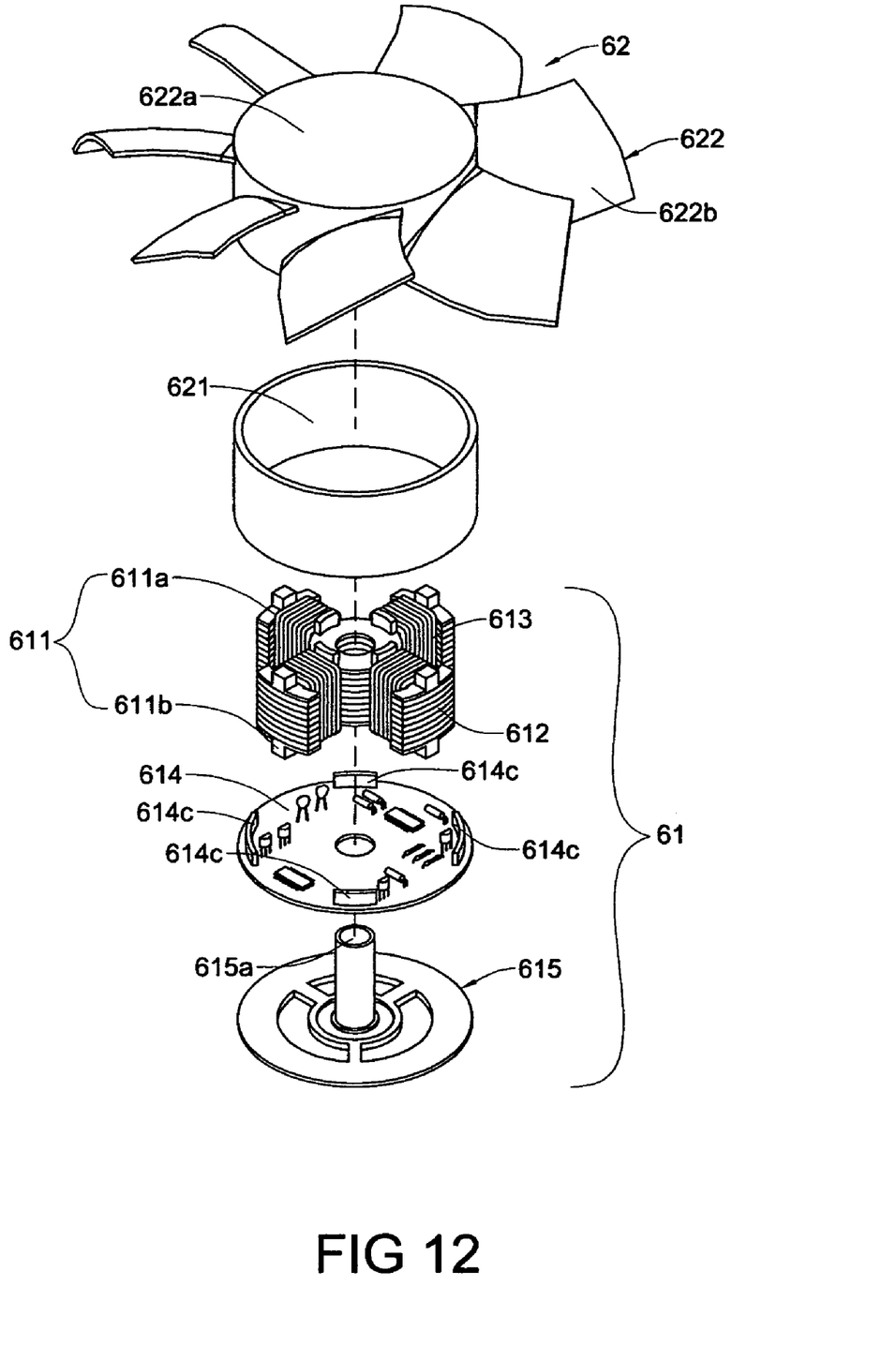
FIG. 12 is an exploded perspective view illustrating the insulation frame of the third embodiment being wound with a coil.
Figure 13:
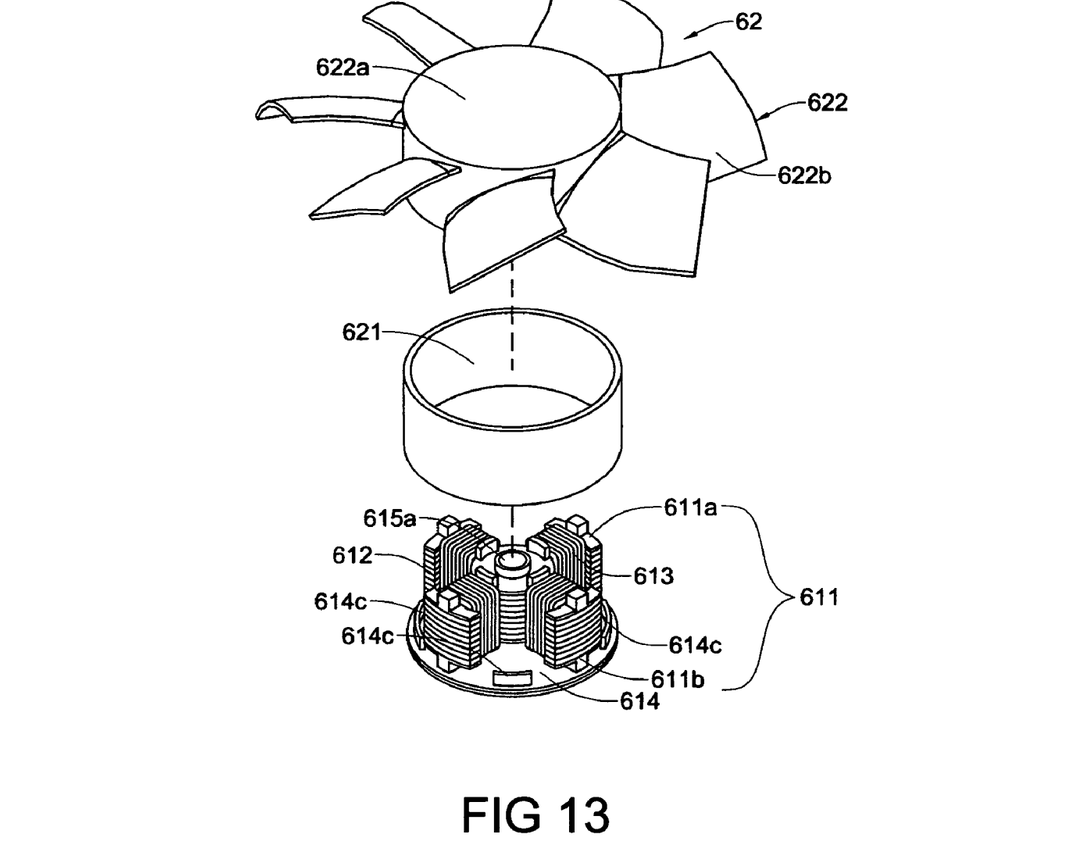
FIG. 13 is a partly perspective view illustrating the insulation frame of the third embodiment being wound with a coil.
Figure 14:
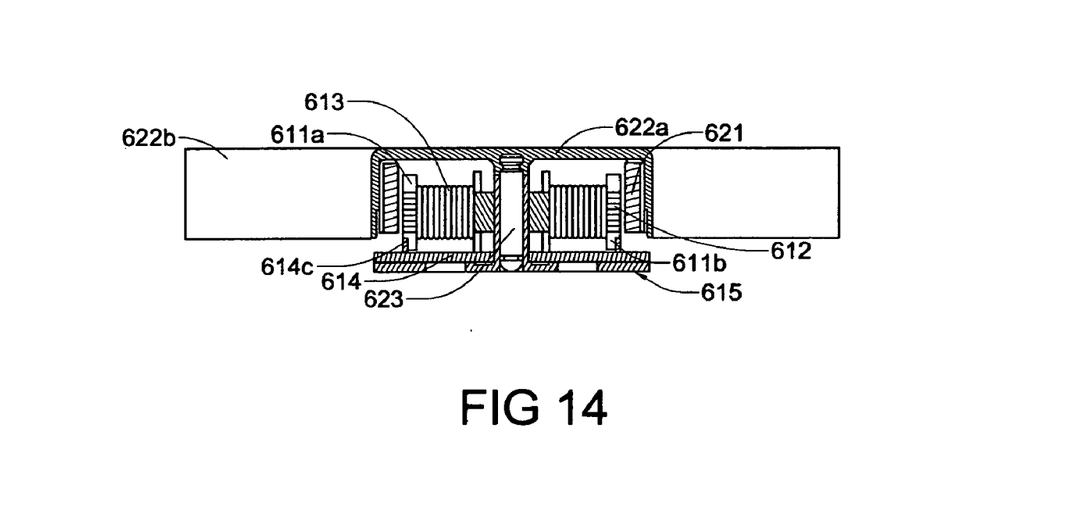
FIG. 14 is a sectional view of the third embodiment of a motor device capable of reducing cogging torque according to the present invention.

Referring to FIGS. 1 and 2, the conventional motor includes a stator device 11 and a otor device 12. The stator further includes an insulation frame 111, a set of silicone steel sheet 112, a coil 113, a circuit board 114 and a support part 115. The insulation frame 111 is composed of an upper frame member 111a and a lower frame member 111b. The coil 113 is wound to the insulation frame 111. The rotor device 12 further includes a magnetic component 121, a fan blade part 122 and a rotational shaft 123. The fan blade part 122 is composed of a hub section 122a and a plurality of fan blades 122b attached to the circumference of the hub section 122a. The magnetic component 121 and shaft 123 are disposed in the hub section 122a and the rotor device 12 movably joined to the stator device 11. In this way, the silicone steel sheets 112 are corresponding to the magnetic component 121 such that the silicone steel sheets 112 and the magnetic component 121 attract to each other.

when the conventional motor is set up, the silicone steel sheets 112 are sandwiched between the upper frame member 111a and the lower frame member 111b and the coil 113 is wound to the insulation frame 111. Then, the insulation frame 111 and the circuit board 114 are attached to the support part 115. Finally, the rotational shaft 123 of the rotor assembly 12 is movably inserted in the receiving bore 115a of the support part 115.

However, the preceding stator device is easily to create cogging torque with the magnetic component and the greater the cogging torque is, the larger the torque ripple.

SUMMARY OF THE INVENTION

A primary object of the present invention is to provide a motor capable of reducing cogging torque.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTION

Referring to FIGS. 3, 4, 5 and 6, the first embodiment of a motor device capable of reducing cogging torque according to the present invention includes a stator assembly 41 and a rotor assembly 42. The stator assembly 41 has a plurality of radial sections and further includes an insulation frame part 411, a plurality of silicone steel sheets 412, a coil 413, a circuit board 414 and a support part 415. The insulation frame part 411 is composed of art upper frame member 411a and a lower frame member 411b. The coil 413 is wound on the insulation frame part 411. a plurality of circular strip members 411c are provided at the bottom of the stator assembly 41 in a way of the respective circular strip member 411c having an end thereof being attached to the circumferential side of the lower frame member 411b and another end thereof extending to the sector shaped space, and the circular members 411c are disposed to space apart from each other in way of without contacting with the silicone steel sheets 412.

The rotor assembly 41 includes a magnetic component 421, a fan blade part 422 and a rotational shaft 422. The fan blade part 422 is composed of a hub member 422a and a plurality of fan blades 422b circumferentially attached to the hub member 422a. The magnetic component 421 and the rotational shaft 423 are disposed in the hub member 422a. The rotor assembly 42 is movably joined to the stator assembly 41 to allow the silicone sheets 412 corresponding to the magnetic component 421 and attracting to each other.

When the first embodiment of the motor device capable of reducing cogging torque according to the present invention is set up, the silicone steel sheets 412 are sandwiched between the upper frame member 411a and the lower frame member 411b and the coil 413 is wound to the insulation frame 411. Then, the insulation frame 411 and the circuit board 414 are attached to the support part 415. Finally, the rotational shaft 423 of the rotor assembly 42 is movably inserted in the receiving bore 415a of the support part 415. Once the motor runs, powerful magnetic force drives the rotor assembly 41 to rotate and the cogging torque is usually created due to insufficient power. The circular strip members 411c are capable of interrupting part of the magnetic force to reduce the cogging torque. In this way, the rotor assembly can rotate steadily.

Referring to FIGS. 7, 8, 9 and 10, the second embodiment of the motor device capable of reducing cogging torque according to the present invention includes a stator assembly 51 and a rotor assembly 52. The stator assembly 51 further includes an insulation frame part 511, a plurality of silicone steel sheets 512, a coil 513, a circuit board 514 and a support part 515. The insulation frame part 511 is composed of an upper frame member 511a and a lower frame member 511b. The coil 513 is wound to the insulation frame part 511 and a ring member 511c is attached to the lower frame member 511b. The circular member 511c has a plurality of projections 511d and the projections 511d are disposed to space apart the silicone steel sheets 512 in a way of not contacting with the silicone steel sheets 512 The rotor assembly 52 includes a magnetic component 521, a fan blade part 522 and a rotational shaft 522. The fan blade part 522 is composed of a hub member 522a and a plurality of fan blades 522b circumferentially attached to the hub member 522a. The magnetic component 521 and the rotational shaft 523 are disposed in the hub member 522a. The rotor assembly 52 is movably joined to the stator assembly 51 to allow the silicone sheets 412 and the circular member 511c corresponding to the magnetic component 521 so as to attracting to each other.

When the second embodiment of the motor device capable of reducing cogging torque according to the present invention is set up, the silicone steel sheets 512 are sandwiched between the upper frame member 511a and the lower frame member 511b and the coil 513 is wound to the insulation frame 511. Then, the insulation frame 511 and the circuit board 514 are attached to the support part 515. Finally, the rotational shaft 523 of the rotor assembly 52 is movably inserted in the receiving bore 515a of the support part 515.

Referring to FIGS. 11, 12, 13 and 14, the third embodiment of the motor device capable of reducing cogging torque according to the present invention includes a stator assembly 61 and a rotor assembly 62. The stator assembly 61 further includes an insulation frame part 611, a plurality of silicone steel sheets 612, a coil 613, a circuit board 614 and a support part 615. The insulation frame part 611 is composed of an upper frame member 611a and a lower frame member 611b. The coil 613 is wound to the insulation frame part 611 and the circuit board 614 is provided with a plurality of circular members 614c. The circular members 614c are disposed to space apart the silicone steel sheets 612 in way of not contacting with the silicone steel sheets 612. The rotor assembly 62 includes a magnetic component 621, a fan blade part 822 and a rotational shaft 622. The fan blade part 622 is composed of a hub member 622a and a plurality of fan blades 622b circumferentially attached to the hub member 622a. The magnetic component 621 and the rotational shaft 623 are disposed in the hub member 622a. The rotor assembly 62 is movably joined to the stator assembly 61 to allow the silicone sheets 612 and the circular sections 614c corresponding to the magnetic component 621 so as to attracting to each other.

When the second embodiment of the motor device capable of reducing cogging torque according to the present invention is set up, the silicone steel sheets 612 are sandwiched between the upper frame member 611a and the lower frame member 611b and the coil 613 is wound to the insulation frame 611. Then, the insulation frame 611 and the circuit board 614 are attached to the support part 615. Finally, the rotational shaft 623 of the rotor assembly 62 is movably inserted in the receiving bore 615a of the support part 615.

Thus, as the foregoing, the motor device capable of reducing cogging torque according to the present invention has the following features:

(1) The stator assembly (41, 51) provides circular members (411c, 511c) at the top or the bottom thereof so that cogging torque created between the stator assembly and the magnetic component (421, 521) can be reduced so as to decrease torque ripples.

(2) The stator assembly 61 provides circular members 614c at the circuit board 614 thereof so that cogging torque created between the stator assembly and the magnetic component (421, 521) can be reduced so as to decrease torque ripples.

(3) The stator assembly (41, 51) provides circular members (411c, 511c) at the top and the bottom thereof so that cogging torque created between the stator assembly and the magnetic component (421, 521) can be reduced so as to decrease torque ripples.

While the invention has been described with referencing to a preferred embodiment thereof, it is to be understood that modifications or variations may be easily made without departing from the spirit of this invention, which is defined by the appended claims.

What is claimed is:

1. A motor device capable of reducing cogging torque, comprising:
    a stator assembly, providing a plurality of radial sections with a sector shaped space being apart from each other; and
    a rotor assembly, being movably disposed in the stator assembly and providing a magnetic component;
    wherein, the stator assembly further comprises:
    an insulation frame part, providing a first frame member and a second frame member;
    a set of silicone steel sheets, being disposed between the frame members in a way of the first frame member being arranged at the top thereof and the second frame member being arranged at the bottom thereof; and
    a coil, being wound around the insulation frame part;
    characterized in that a plurality of circular strip members are provided at the bottom of the stator assembly in a way of the respective circular strip member having an end thereof being attached to the circumferential side of the second frame member and another end thereof extending to the sector shaped space; and the circular strip members space apart from each other without contacting the silicone steel sheets;
    whereby, the circular strip members arc capable of interrupting part of magnetic force resulting from interaction between the stator assembly and the rotor assembly for reducing a cogging torque during the rotor assembly running such that the rotor assembly is able to rotate steadily.

* * * * *